April 14, 1936.  T. L. LESLIE  2,037,137

PLANT CULTIVATION

Filed Nov. 4, 1935

Inventor:
Thomas L. Leslie,
By Raymond Underwood
Attorney.

Patented Apr. 14, 1936

2,037,137

UNITED STATES PATENT OFFICE 2,037,137

PLANT CULTIVATION

Thomas Lincoln Leslie, Mauna Loa, Molokai, Territory of Hawaii, assignor of thirty-one one-hundredths to Alexander Benjamin Leslie, Hoolehua, thirty-one one-hundredths to Hugh Howell, Kaunakakai, and seven one-hundredths to Clifton Howard Tracy, Honolulu, Territory of Hawaii Application November 4, 1935, Serial No. 48,248

10 Claims. (Cl. 47—44)

This invention relates to plant cultivation, and more particularly to the cultivation of pineapple plants or the like.

It is to be expressly understood that although the invention is here disclosed with reference to pineapple plants, that the invention is not limited to use in connection with them, but may be applied to any plant of an analogous nature.

The first fruit, called the "plant crop", grown by a pineapple plant normally grows upright and presents no special problem in its cultivation. Subsequent fruit, however, grown from the same plant is an offshoot product called a "rattoon", which naturally grows angularly from the parent vertical stalk of the plant. The angle from the vertical is generally so great especially in the outside rows as to cause serious losses of various kinds as hereinafter described. It is the primary object of this invention to cause the upright growth of all fruit produced subsequent to the first fruit. The important advantages of this will hereinafter be pointed out.

In the accompanying drawing, showing a preferred embodiment of the invention:

Figure 1:
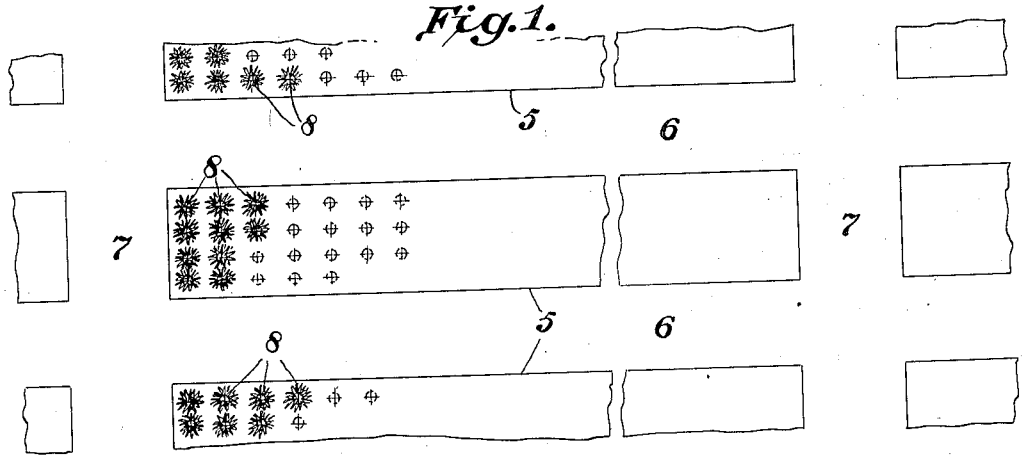
Fig. 1 is a plan of a portion of a representative pineapple field divided into plots.
Figure 2:
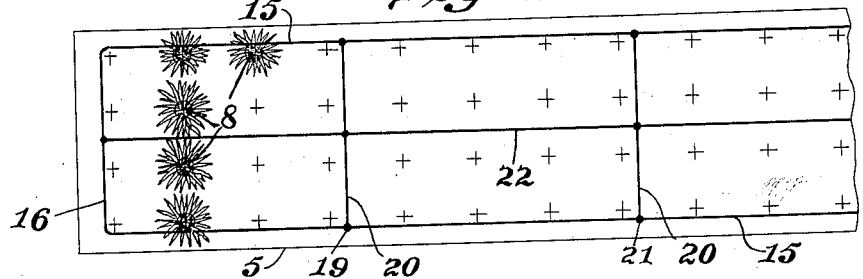
Fig. 2 is a plan of a portion of a single plot.
Figure 3:
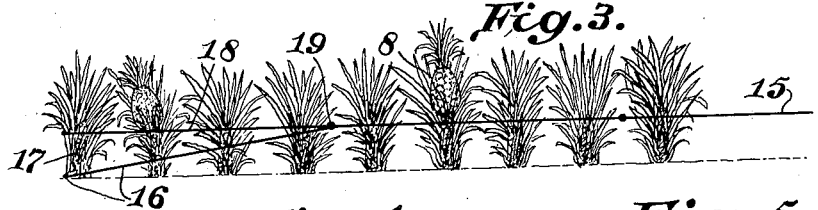
Fig. 3 is an elevation of Fig. 2.

As shown in Fig. 1, the field is subdivided into plots 5 each of narrow elongated shape separated at their long sides by narrow aisles 6 and at their narrow ends by normally wider roadways 7. Inasmuch as the plants are grown so close together within each plot that they contact with each other, a picker is prevented from entering between the plants. The aisles, therefore, provide the only access to the plants and for this reason it is important that the aisles be kept clear for passage. The plots must me so narrow that a picker within the aisles may reach the fruit of the innermost plants and for this reason it is seldom that the plots are more than four plants wide although the plots may be only wide enough to accommodate three or even two lines of plants. No definite limit is set upon the length of the plots as this ordinarily is determined by the nature of the terrain and the manner in which the particular field is subdivided. However it may be said that a standard plot does not exceed three hundred feet in length, or four and a half feet in width for four plants.

Figure 4:
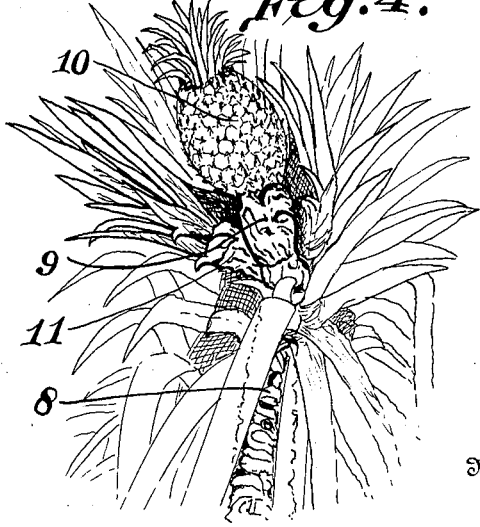
Fig. 4 is a side view of a single plant having a young sucker.

The individual pineapple plant 8 consists of a central vertical stem 9 out of the top of which the first fruit grows as shown at 10 in Fig. 4. This first fruit 10 normally grows upright from the stem and since it remains in this elevated position throughout its development no special difficulty is experienced in connection with its growth. During the development of this first fruit, a sucker 11 grows as an offshoot from the stem 9 of the mother plant, at a point below the fruit 10. This sucker 11 will subsequently develop a pineapple fruit, the development and ripening of the second fruit so produced being after the first fruit has been gathered.

It will be clear that due to the angular relation of this sucker 11 to the stem 9 of the mother plant, that the entire plant will tend to fall over on its side under the weight of the heavy fruit upon the sucker. This results in such a spreading of the outside rows that the aisles between the outer rows of the adjacent plots become so clogged that the whole field looks like a solid mass of pineapple plants, and it is sometimes difficult even to locate the aisles. Considerable loss results. Passage of the workers is impeded. Picking, cultivating, and gathering of shoots, is adversely affected. Improper aeration and exposure to the sun of both soil and plants is brought about. Damage to the fruit results from being stepped on, from uneven exposure to the sun, or from resting on the ground. A fruit which cannot be sold inevitably results.

In addition to the above disadvantages, the inclination of the plants causes the slips or shoots which spring from these plants to be curved, rendering them unfit for planting. For this reason, shoots for planting are rarely taken from parent plants yielding a rattoon crop, thus making it necessary at times to bring material for planting new fields from a long distance, or even to buy it from other growers.

In accordance with the present invention the suckers from which the second growth fruit develop are trained to grow upright. The fruit then develops in a manner similar to the first fruit grown. This is attained by a wire network which constrains the growth of the suckers to a substantially vertical position. This network comprises wires 15 extending longitudinally of the plot and along the outside of the outermost plants. The ends 16 of wires 15 may be anchored to the ground in any suitable manner or may possibly be unanchored. As here shown by way of example, the ends 16 are passed around the end plants 17 at the base thereof to form an encircling loop connecting the longitudinal wires 15. Obviously, the opposite wires 15 and such a connecting loop, may be portions of one integral wire. The ends 16 of wires 15 may, however, be separately anchored to the ground to posts (not shown) or may be buried in the ground (not shown). By anchoring the wires 16, endwise movement of the longitudinal wires 15 is resisted.

To retain the end plants 17 upright a bridle wire 18 is connected to the longitudinal wires 15 at the points 19. This bridle wire 18 encircles the end plants 17 at the same height from the ground as the longitudinal wires 15. It is apparent that the bridle wire 18 and longitudinal wires 15 may, if desired, be portions of a single wire and that the anchoring end wires 16 may be separate pieces connected at 19.

Connecting the longitudinal wires at spaced intervals are transverse wires 20. These wires 20 may be spaced at any convenient intervals which are found to maintain the longitudinal wires in substantial parallelism. An interval of about five feet has been found to be practical. The connection between these several wires at their meeting points as 19 and 21 may be formed in any desired manner and since the specific connection forms no part of this invention it is not shown. It may for example be formed by twisting or looping the wires, or by welding.

When the plot to which the wire network is to be applied has a slope transverse to the longer dimension of the plot, the centrally disposed longitudinal wire 22 will be found desirable to prevent the interior plants from leaning over. This wire 22 may be affixed to the transverse wires in any suitable manner. When a plot is on relatively flat land the central wire may be altogether eliminated.

Figure 5:
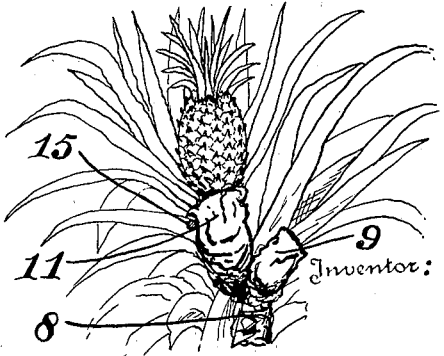
Fig. 5 is a side view of a plant showing the positioning of the restraining wire.

The wires 15, 18, 20 and 22 are placed at a height to contact with the suckers at a point above their connection with the main stem of the mother plant, but at a sufficient distance below the base of the fruit to assure that no individual fruit comes in contact with the wire, as shown in Fig. 5. In this manner the suckers are brought into an upright position. Since the outside plants are maintained upright by the wires, the inner plants are also constrained to grow upright by receiving lateral support from the outside plants. This lateral support results from the closeness of the plants to each other, as has been pointed out. The suckers with their heavy fruit cannot grow outwardly into the aisles, because of the restraining wires, nor can the inwardly growing suckers fall downwardly since they receive lateral support from adjoining plants.

It is important to note that the wires are applied during the early growth of the suckers shortly after the harvesting of the "plant crop". At that time they are readily brought into an upright position. Thereafter the suckers are constrained to grow under control of the wires, and the wires remain with the suckers during their growth and development of the fruit. This avoids the difficulty that would be experienced in attempting to pull into an upright position, a fully matured growth. In accordance with the present invention the wires determine the direction for growth of the suckers and then assure this desired growth by remaining in contact with the suckers.

The fact, which should be observed, that the wires are wholly supported in elevated position by the plants themselves, is of importance for several reasons. It permits the free upward movement of the restraining wires along with the growth of the plants, as the wires are free to be carried upwardly with the plant. It makes it possible to eliminate all wire supporting means, and results in the supporting of the wires by the plants which are in turn receiving support from the wires. Thus, the plants and wires form a unity and secure the benefits resulting from their interrelated association. A lateral movement of a plant is transmitted either directly to a wire, or through the contacting plants to a wire. Movement in all directions is therefore effectively precluded as mutual support is provided by the several plants to each other, due to the restraining wires.

The upright growth of the fruit developed on the suckers is of considerable importance. The aisles between the plots are kept clear of overhanging plants and, for the full cycle of two, three or even more rattoon crops of pineapples. This cheapens and makes more effective, field operations of all kinds, for example cultivating, weeding, spraying, fertilizing, draining, harvesting, gathering plant shoots, inspecting, etc. Use is allowed of more farm machinery and implements, not only those now in existence, but of other and better devices, the development of which is encouraged. Better aeration is had of the soil not only in the aisles, but throughout the plots, thus drying up pools of standing water which gather from protracted rains and which are especially injurious to pineapple plants. The sunlight which is an effective deterrent to certain kinds of plant disease is allowed to reach the soil in the aisles and around the bases of the plants. The missing of the fruit by the pickers which would otherwise be concealed by the leaves, is precluded. The fruit cannot be trampled upon and destroyed either by being crushed or by being bruised, which ruins it. This is of especial importance when it is considered that if the fruit were hanging down it would be obscured not only by the leaves but also by the bag which the picker carries.

In addition to the effects due to the improvements of soil and other conditions above noted the invention results in the production of fruit of a better quality, larger individual sizes, and greater tonnage per acre. This is because the normal position of a pineapple plant, and of the fruit itself, is upright, and plants and fruit so maintained are more healthy and vigorous than those inclined from the vertical. The fruit in an upright position will receive the sunlight more uniformly and in this normal position never becomes sunburned but ripens properly. Upstanding fruit is never covered with leaves. The crown at the top of the fruit protects it somewhat, when in an upright position, from the hottest rays of the sun in the middle of the day. There is no danger of the fruit becoming damaged by contact with the ground or anything else. All of the fruit in one field or section growing under more uniform conditions, will tend to come to maturity and ripen more uniformly, thereby reducing the cost of harvesting.

The maintenance of all of the plants in an upright position will tend to produce more suitable planting material for planting other adjacent areas, for the shoots or slips from the upright plants will partake of the nature of the parent plant and be straight.

As a result of practicing this invention, a higher grade of fruit (commanding a higher price per ton) and a considerable increase of tonnage is produced, with the increase of financial returns greater than the cost of applying the invention; and it will be noted that the increased financial returns from all subsequent crops is nearly all net profit, because the wires once installed for the first sucker or rattoon crop will outlast the full cycle of all subsequent crops without further cost for labor and material.

It will be understood that the invention is not limited to use with the first sucker growth but can be used in connection with all subsequent sucker growths. By holding the plants in better position for bearing fruit and keeping them in more vigorous condition by insuring more effective cultivation, spraying and fertilizing, etc., as above described, there will be insured at least a second rattoon crop, and probably a third rattoon crop and perhaps a fourth that will be large enough to be profitable. Greater usefulness is thus had of the mother plant and replanting of the field at less frequent intervals is made possible.

In practicing the invention it is unimportant whether the separate wires are individually applied to the plants and interconnected at that time, or whether the wire network is wholly or partially prefabricated and applied to the plants as a finished or semi-finished article. If a partially prefabricated wire network is employed, the final assembly and connections will of course preferably be made when applied to the plants. Practical use of the invention has led to the conclusion that in most cases it is preferable that the network be completely prefabricated.

What is claimed is:

1. Means for causing the upright growth of suckers of pineapple plants which are grown in close contact with each other, comprising a pair of longitudinal wires positioned on the outside of the plants and at the height of the suckers, the ends of said wires receiving support from the ground, and bridle wires encircling the end plants and connected to the longitudinal wires at the height of the suckers.

2. Means according to claim 1 in which the ends of the longitudinal wires are anchored to the base of the end plants.

3. Means according to claim 1 in which the ends of the longitudinal wires are joined and encircle the end plants at the bases thereof.

4. Means according to claim 1 in which the longitudinal wires are connected at spaced intervals by transverse wires.

5. Means for causing the upright growth of suckers of pineapple plants which are grown in close contact with each other, comprising a wire encircling the outside of the plants at the level of the suckers, and anchoring wires connected at one end to the encircling wire at points inwardly of the endmost plants and anchored at the other end to the ground, said anchoring wires lying in substantially vertical parallel planes.

6. Means for causing the upright growth of suckers of pineapple plants which are grown in close contact with each other, comprising a wire extending longitudinally along the outside of the plants at the height of the suckers and having the portion thereof at the end plants engaging the bases of the end plants to prevent longitudinal movement of the wires, and a bridle wire extending around the end plants at the height of the suckers and connected to the first mentioned wire inwardly of the end plants.

7. Means for causing the upright growth of suckers of pineapple plants which are grown in close contact with each other and in parallel rows, comprising a pair of longitudinal wires positioned on the outside of the plants and extending parallel with the plant rows, means for sustaining said wires against longitudinal movement, and transverse wires connecting the longitudinal wires at spaced intervals to retain the longitudinal wires in substantial parallelism.

8. Means according to claim 7 in which a wire is disposed between said longitudinal wires and extends parallel with the plant rows, and is connected to said transverse wires.

9. The method of controlling the growth of the suckers of pineapple plants grown in close contact with each other, including the step of applying wire means to the young sucker and drawing the suckers into a substantially upright position, and permitting the growth of the suckers under restraint of said wire means.

10. The method according to claim 9 in which the suckers are permitted to grow under constraint solely of the wire means whereby the wire means is carried upwardly with the growing suckers.

THOMAS LINCOLN LESLIE.